Nov. 17, 1936.　　　P. L. GEER　　　2,061,376
RECUPERATOR STRUCTURE
Filed June 12, 1931　　　2 Sheets-Sheet 2
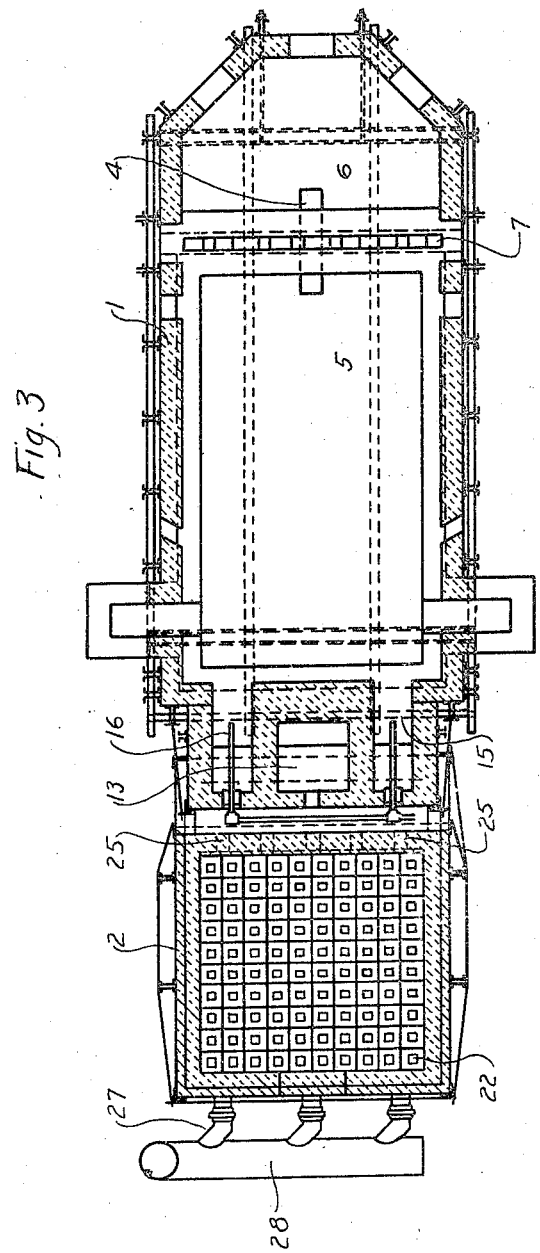

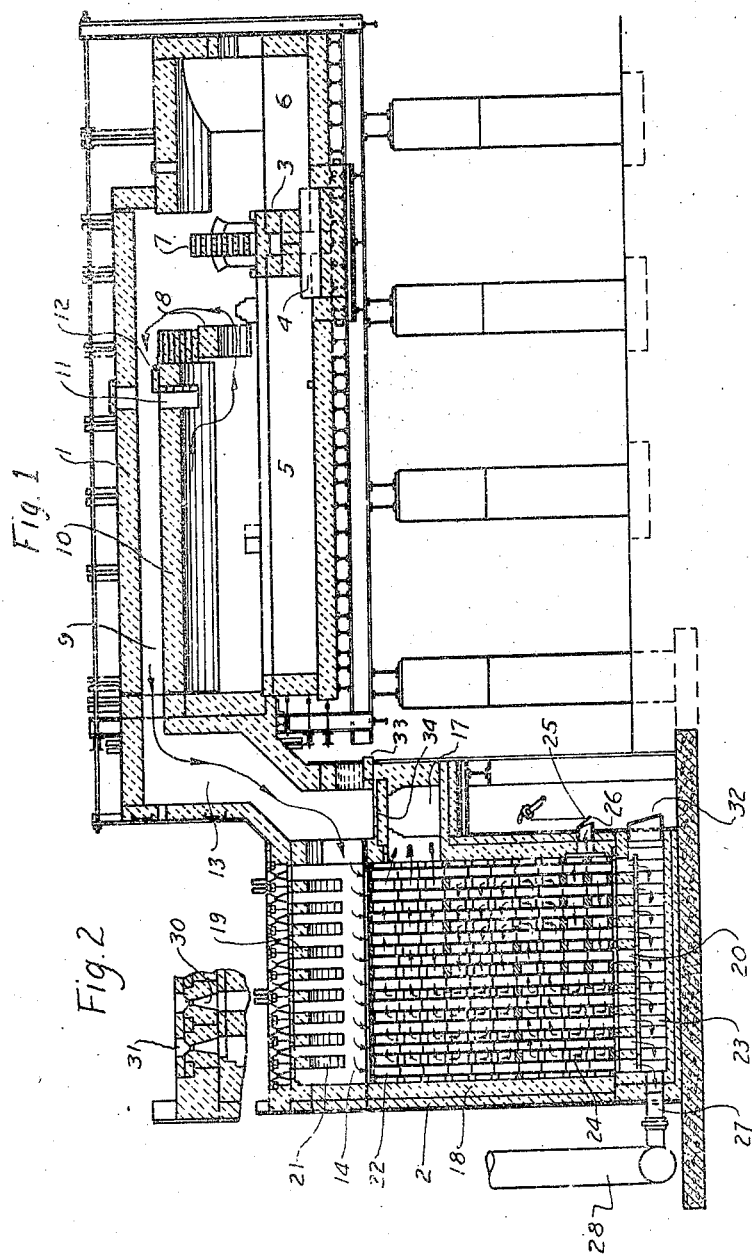

Patented Nov. 17, 1936

2,061,376

UNITED STATES PATENT OFFICE 2,061,376

RECUPERATOR STRUCTURE

Paul L. Geer, Bellevue, Pa., assignor to Amco, Incorporated, Pittsburgh, Pa., a corporation of Pennsylvania Application June 12, 1931, Serial No. 543,801

11 Claims. (Cl. 263—20)

This invention relates to recuperators or heat exchangers and more particularly to improvement in recuperators for glass melting furnaces which are especially constructed to resist the deleterious fluxes and corrosive action of the waste gases at the entrance flues of the recuperator structure.

It is among the objects of the invention to provide a recuperator in which the vertical flues or tubes constitute the waste gas passages, and the horizontal flues the preheating air passages, and which shall be provided with a waste gas chamber at the top or entrance end of the waste gas passages.

A further object of the invention is the provision of means for cleaning the waste gas passages or flues through a series of openings or poke holes on the roof of the recuperator which openings are in alinement with the vertical tubes and for removing the slag through an opening in an ash pit provided at the bottom of the recuperator structure.

A further object of the invention is the provision of means for drawing the waste gases slowly vertically downward through the recuperator passages and to draw the air to be preheated, around the waste gas tubes, through a path of maximum length upwardly to subject the air to a uniform rise in temperature until it attains its maximum heat in the region of the maximum temperature of the waste gases at the top of the recuperator.

A further object of the invention is the construction of a recuperator in which the roof structure is especially reinforced, and insulated against heat losses and still another object of the invention is the provision of means for regulating the volume of air that passes into the recuperator structure to be preheated.

In accordance with the present invention the waste gases are passed simultaneously to all of the tube members and are drawn vertically downward to thermally equalize the temperature of the waste gases and maintain a thermal balance through any horizontal element of the recuperator by taking advantage of the natural gravitational action of the fluid passing downwardly through the said tubes. By providing a common distributing chamber over the tubes, the specific weight of the gases at any horizontal element will be automatically equalized and this balance is maintained by the use of a common discharge chamber at the bottom of the vertical tubes which creates a uniform negative pressure at the base of all of the tube outlets.

By means of this improvement, the air to be preheated may be circulated about the tubes a greater number of times than in the ordinary form of recuperator structure thereby greatly increasing the temperature of the air over that attained where the flow of air was not controlled in its upward passage through the recuperator structure.

By increasing the length of path of the air travel, the air is heated to higher temperatures and is conducted to the fuel chamber at a uniform temperature in excess of temperatures heretofore obtained thereby effecting greater economy in the conservation of the heat of the waste gases.

The invention will be more clearly understood in connection with a description of the accompanying drawings constituting a part hereof in which like reference characters designate like parts and in which:—

Figure 1 is a vertical cross-sectional view extending longitudinally of a recuperator and glass melting furnace structure embodying the principles of this invention;

Figure 2 is a cross-section of a detailed portion of the roof structure of the recuperator and;

Figure 3 is a longitudinal horizontal cross-section of the recuperator and glass melting tank shown in Figure 1.

In the drawings, I generally designates a glass melting tank and 2 the recuperator structure. The glass melting tank is constructed with a bridge wall 3 having a submerged passage 4 through which the molten glass or metal passes from a melting chamber 5 to a working chamber 6. A partition wall 7 is built on the bridge wall 3 and a second partitioned wall 8 is constructed in parallel relation with the wall 7 to constitute a passage to a waste gas outlet 9 above the crown 10 of the glass melting tank.

The crown is provided with a passage 11 which may be controlled by a damper 12 to divert the gases to cause them to pass between the walls 7 and 8 when it is desired to obtain an increased temperature at the front or working end 6 of the tank.

The horizontal passage 9 communicates with a vertical waste gas passage 13 leading to a distributing chamber 14 of the recuperator structure 2.

As shown in Figure 3 the waste gas passage 13 is disposed between a pair of burner ports 15 in which fuel burners 16 are disposed as shown in Figure 3. The ports 15 communicate with a common passage 17 leading from the top horizontal passages of the recuperator structure through which preheated air is supplied to the burners 16.

The recuperator consists of side, top and bottom walls, 18, 19, and 20 respectively and the top wall 19 is provided with reinforcing arches 21. A plurality of vertical tubes or flues 22 extend from the distributing chamber 14 of the recuperator to the exhaust chamber 23 at the bottom of the recuperator and the vertical tubes 22 are constructed of tile which form horizontal air passages 24 through which air is conducted from inlets 25 at the bottom of the recuperator to the preheated air passage 17 at the top of the recuperator.

The air inlets 25 are provided with adjustable dampers 26 to regulate the amount of air passing through the recuperator tile structure there being five air inlets shown in Figure 3 of the drawings to provide for the proper distribution of the air in the flue structure of the recuperator.

The common exhaust passage or chamber 23 at the bottom of the vertical waste gas passages is similarly connected by outlet connections 27 to an exhaust manifold 28 which passes either to a stack or to an exhaustor. The multiple outlets 27 and the distribution chamber 14 at the top of the recuperator provide uniform distribution or flow of the waste gases from the top to the bottom of the recuperator.

As shown in the enlarged detail view of Figure 2, a plurality of poke holes 30 are provided in alinement with the vertical flues 22 and these poke holes are provided with insulated plugs 31 to prevent the escape of the gases or heat when the poke holes are closed in the normal function of the recuperator.

The poke holes provide access to the vertical tubes 22 to permit cleaning them by the injection of a conduit to blow out the tubes 22 if they become deposited with slag from the waste gases passing therethrough and the poke holes further permit of extending a rod into the vertical tubes 22 in the event it is necessary to remove the slag from the inner walls thereof. The vertical tubes are constructed to provide straight uninterrupted walls on the interior thereof so as to reduce the friction of the waste gas flow to a minimum and to prevent the accumulation or lodging of slag in the tube.

The horizontal air passages 24 of the recuperator structure are spaced relatively close to produce a maximum length of path for the travel of the air with the final portion of the path adjacent the wall of the waste gas distributing chamber 14. It is to be noted in Figure 1 of the drawings that the air passages 24 progressively increase in area from the bottom to the top as shown by the cross-section of the tile, there being four passes of the air transversely of the waste gas flues from the air inlet at the bottom to the outlet at the top.

The exhaust chamber 23 of the recuperator constitutes an ash pit having the door 32 through which the solid particles of slag are removed when the tubes are cleaned out and a sloping sump 33 is provided at the bottom of the waste gas passage 13 to permit of the removal of molten slag accumulating on the partition 34 at the entrance end of the recuperator.

The operation of the recuperator structure is briefly as follows:

The waste gases from the melting tank are drawn either through the vertical passage constituted by the walls 7 and 8 when the flue 11 is closed by the damper 12 or if the damper is open the waste gas travels from the vertical flue or slot into the passage 9 between the roof 10 and the crown wall of the melting tank. The hot gases then pass downwardly through the passage 13 into the distributing chamber 14 of the recuperator structure where they are more or less stabilized or balanced and then are drawn vertically downward through all of the tubes 22 simultaneously.

Because of the common exhaust chamber 23 at the bottom of the tubes, the gases are subjected to a uniform negative pressure and are drawn downwardly into the exhaust manifold 28. Simultaneously, the air is drawn through the intakes 25 into the horizontal passages 24 passing back and forth horizontally towards the upper region of the recuperator and gradually increasing in temperature as it absorbs the heat of the high temperature gases at the top of the recuperator. The final path of the air is adjacent the wall of the distributing chamber 14 and it passes at a uniform temperature to the passage 17 leading to the burner ports 15.

By regulating the dampers 26, a uniform volume of air is drawn through all parts of the recuperator structure so that all of the air is at a uniform temperature as it leaves the recuperator thereby increasing the temperature generally of the air entering the burner ports 15.

If the slag carried over in a gaseous state from the melting tank accumulates on the inner wall of the vertical tubes, the plugs 31 of the poke holes 30 are lifted and the deposits are removed either by an air blast or by a rod. In this manner, the heat exchange efficiency or capacity of the tubes is maintained, and clogging is prevented.

By passing all of the waste gases initially into the distributing chamber 14, the entire volume of the gas is passed through such a large number of vertical tubes that the heat of the gases is not concentrated on a small number of tubes as in the type of recuperator where the waste gases enter the recuperator structure in a vertical direction and on this account the refractory material is not subjected to the destructive corrosive action of the hot gases as in the prior art devices.

It is evident from the foregoing description that a recuperator structure made in accordance therewith provides for efficient exchange of heat between the waste gas passing from the furnace chamber and the air passing into the chamber and by uniformly heating all of the air passing through the recuperator structure, the air is of a substantially higher temperature as it enters the glass melting chamber.

By providing the poke holes in the roof of the recuperator and by employing vertical tubes with uninterrupted walls, the tubes are maintained in good condition and the recuperator can be cleaned and reconditoned without necessitating frequent renewal and without discontinuing its operation for any substantial period of time.

Features of the invention pertaining to glass melting apparatus herein described but not claimed are prosecuted and claimed in a copending application serially numbered 616,176 filed June 9, 1932.

I claim:

1. In a recuperator, a tile structure forming a series of vertical and horizontal passages in heat exchange relation, a distributing chamber at the top of the vertical passages, an exhaust chamber at the bottom of said vertical passages, said chambers being common to all of said vertical passages, and said horizontal passages having a plurality of air inlets adjacent the bottom of the recuperator structure, and a plurality of air outlets at the top of the structure, regulable means for controlling the volume of air drawn into said horizontal passages and means associated with the vertical passages to progressively vary the area of the horizontal passages from the air inlets to the air outlets.

2. In a recuperator a tile structure forming a series of vertical tubes having uninterrupted walls on the interior thereof constituting waste gas passages, and having a series of horizontal passages in heat exchange relation with the waste gas passages extending from the bottom of the tile structure to the top thereof and progressively varying in area from the bottom passage to the top passage, a distributing chamber at the top of the tile structure, and a common exhaust means at the bottom of the vertical tubes, regulable means for controlling the volume of air drawn into the horizontal passages at the bottom of the tile structure, and an exhaust means for applying a substantially uniform negative pressure at the bottom of said waste gas passages.

3. In a recuperator, a tile structure forming a series of vertical tubes, constituting waste gas passages having uninterrupted wall surfaces on the interior thereof, and having partition means associated therewith to form a series of horizontal air passages of varying area from the bottom to the top on the exterior thereof, a common chamber at the top of said vertical tubes and a common chamber at the bottom of said vertical tubes, said top chamber leading to the exhaust waste gas passage of a furnace chamber and said bottom chamber leading to a plurality of exhaust openings, a perforated roof structure having its openings in alinement with said vertical passages constituting poke holes for cleansing said passages, and movable closures for said poke holes to seal said top chamber in the normal operation of the recuperator structure.

4. In a recuperator, a tile structure forming a series of vertical passages having uninterrupted interior wall surfaces and forming a series of communicating horizontal passages on the exterior thereof, a chamber at the top of said tile structure, and a chamber at the bottom thereof, a plurality of air inlet passages communicating with the bottom of the horizontal passages, and a plurality of exhaust passages communicating with said bottom chamber, means for regulating the volume of air flowing into said horizontal passages, independent means for changing the velocity of said air flow from the bottom to the top and means for rendering said vertical tubes accessible for cleansing the deposits therein and for removing the deposit from the bottom chamber of the recuperator structure.

5. In a recuperator, a tile structure forming a series of vertical passages having uninterrupted interior wall surfaces constituting waste gas passages and having their exterior wall portions flanged to form a series of communicating horizontal passages of maximum length, a plurality of air inlets at the bottom of said horizontal passages having regulable means for controlling the volume of air passing through the recuperator structure, means progressively varying the velocity of the air flow from the bottom to the top independent of regulated volumetric changes and an exhaust means for drawing waste gases uniformly through all of said vertical passages simultaneously whereby the specific weight of the gases at any horizontal element, will be equalized.

6. In a recuperator, a tile structure forming a series of vertical tubes constituting waste gas passages having uninterrupted wall surfaces on the interior thereof and having partition means associated therewith to form a series of horizontal air passages on the exterior thereof, a common chamber at the top of said vertical tubes and a common chamber at the bottom of said vertical tubes, said top chamber leading to the exhaust waste gas passage of a furnace chamber and said bottom chamber leading to a plurality of exhaust openings, a perforated roof structure having its openings in alignment with said vertical passages constituting poke holes for cleaning said passages, a series of spaced arches supporting said roof structure, and movable closures for said poke holes to seal said top chamber in the normal operation of the recuperator structure.

7. In a recuperator, a tile structure forming a series of vertical tubes constituting waste gas passages having uninterrupted wall surfaces on the interior thereof and having partition means associated therewith to form a series of horizontal air passages on the exterior thereof, a common chamber at the top of said vertical tubes and a common chamber at the bottom of said vertical tubes, said top chamber leading to the exhaust waste gas passage of a furnace chamber and said bottom chamber leading to a plurality of exhaust openings, a roof structure of perforated blocks having their openings in alignment with said vertical passages constituting poke holes for cleaning said passages, a series of spaced arches supporting the blocks of said roof structure and movable closures for said poke holes to seal said top chamber in the normal operation of the recuperator structure.

8. In a melting furnace, the combination which comprises a combustion laboratory in the furnace, a recuperator adjacent thereto, a channel for preheated air communicating with the recuperator and the said laboratory, spaced fuel inlets in the bottom of the channel, a waste gas flue over the laboratory, and a passageway for waste gas communicating with the flue and the recuperator having walls thereof common to the channel and the passageway.

9. In a melting furnace, the combination which comprises a combustion laboratory in the furnace, a recuperator adjacent thereto, a channel for preheated air communicating with and substantially across the recuperator and the said laboratory, spaced fuel inlets in the bottom of the channel, a waste gas flue over the laboratory, and a passageway for waste gas communicating with the flue and the recuperator.

10. In a melting furnace, the combination which comprises a combustion laboratory in the furnace, a recuperator adjacent thereto, a channel for preheated air communicating with the recuperator and the said laboratory, spaced fuel inlets in the bottom of the channel, a waste gas flue over the laboratory, and a passageway for waste gas communicating with the flue and substantially across the recuperator.

11. In a melting furnace, an air preheater, a pair of aligned flues between the furnace and preheater, a plurality of spaced angularly disposed fuel inlets in the bottom of said flues, and a waste gas chamber over the flues having the lower side thereof common to each of the flues.

PAUL L. GEER.